United States Patent
Cho et al.

(10) Patent No.: US 10,790,498 B2
(45) Date of Patent: Sep. 29, 2020

(54) POSITIVE ACTIVE MATERIAL FOR RECHARGEABLE LITHIUM BATTERY, METHOD OF PREPARING THE SAME, ELECTRODE INCLUDING THE SAME, AND RECHARGEABLE LITHIUM BATTERY INCLUDING THE ELECTRODE

(71) Applicant: UNIST(ULSAN NATIONAL INSTITUTE OF SCIENCE AND TECHNOLOGY), Ulsan (KR)

(72) Inventors: Jaephil Cho, Ulsan (KR); Jun Hyeok Kim, Ulsan (KR); Hyun Su Ma, Ulsan (KR)

(73) Assignee: UNIST (ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 81 days.

(21) Appl. No.: 15/761,030

(22) PCT Filed: Nov. 7, 2017

(86) PCT No.: PCT/KR2017/012536
§ 371 (c)(1),
(2) Date: Mar. 16, 2018

(87) PCT Pub. No.: WO2019/078399
PCT Pub. Date: Apr. 25, 2019

(65) Prior Publication Data
US 2019/0296324 A1   Sep. 26, 2019

(30) Foreign Application Priority Data
Oct. 20, 2017 (KR) .................. 10-2017-0136614

(51) Int. Cl.
*H01M 4/00* (2006.01)
*H01M 4/131* (2010.01)
(Continued)

(52) U.S. Cl.
CPC ............ *H01M 4/131* (2013.01); *C01G 53/42* (2013.01); *C01G 53/50* (2013.01);
(Continued)

(58) Field of Classification Search
CPC ...... H01M 4/131; H01M 4/485; H01M 4/525; H01M 10/052; H01M 10/058;
(Continued)

(56) References Cited

U.S. PATENT DOCUMENTS

2012/0070743 A1   3/2012   Kwon et al.
2015/0228979 A1   8/2015   Lee et al.

FOREIGN PATENT DOCUMENTS

CN   103700836   *   4/2014
CN   104868122        8/2015
(Continued)

OTHER PUBLICATIONS

Machine translation of CN 103700836, obtained Aug. 26, 2019 (Year: 2014).*
(Continued)

*Primary Examiner* — Nicholas P D'Aniello
(74) *Attorney, Agent, or Firm* — Klarquist Sparkman, LLP

(57) ABSTRACT

Provided is a monocrystalline cathode active material for a lithium secondary battery, the monocrystalline cathode active material being represented by the Formula of $Li_xP_yNi_{1-a-b}Co_aA_bO_2$.

16 Claims, 13 Drawing Sheets

(51) Int. Cl.

| | | |
|---|---|---|
| *C01G 53/00* | (2006.01) | |
| *H01M 4/1391* | (2010.01) | |
| *H01M 4/505* | (2010.01) | |
| *H01M 10/0525* | (2010.01) | |
| *H01M 10/058* | (2010.01) | |
| *H01M 10/052* | (2010.01) | |
| *H01M 4/525* | (2010.01) | |
| *H01M 4/485* | (2010.01) | |
| *H01M 4/02* | (2006.01) | |

(52) U.S. Cl.
CPC ......... *H01M 4/1391* (2013.01); *H01M 4/485* (2013.01); *H01M 4/505* (2013.01); *H01M 4/525* (2013.01); *H01M 10/052* (2013.01); *H01M 10/058* (2013.01); *H01M 10/0525* (2013.01); *C01P 2002/54* (2013.01); *C01P 2002/85* (2013.01); *C01P 2004/03* (2013.01); *C01P 2004/04* (2013.01); *C01P 2004/61* (2013.01); *H01M 2004/027* (2013.01)

(58) Field of Classification Search
CPC ............. H01M 10/0525; H01M 4/505; H01M 4/1391; H01M 2004/027; C01G 53/42; C01G 53/50; C01P 2004/03; C01P 2004/04; C01P 2002/54; C01P 2002/85; C01P 2004/61
See application file for complete search history.

(56) References Cited

FOREIGN PATENT DOCUMENTS

| CN | 105449169 | 3/2016 |
|---|---|---|
| CN | 106229489 | 12/2016 |
| CN | 106410182 | 2/2017 |
| JP | H1116571 | 1/1999 |
| JP | H10241691 | 1/1999 |
| JP | 2001076724 | 3/2001 |
| JP | 2006-054159 A | 2/2006 |
| JP | 2016-152139 A | 8/2016 |
| JP | 2017506805 | 3/2017 |
| KR | 10-2005-0052266 A | 6/2005 |
| KR | 20050052266 | 6/2005 |
| KR | 10-2012-0030774 A | 3/2012 |
| KR | 10-2015-0042730 A | 4/2015 |
| KR | 10-2015-0076402 A | 7/2015 |
| KR | 20150076402 | 7/2015 |
| KR | 10-2015-0095451 A | 8/2015 |
| KR | 10-2017-0063408 A | 8/2017 |
| WO | WO 2015/053586 A1 | 4/2015 |
| WO | WO 2017/095153 A1 | 6/2017 |

OTHER PUBLICATIONS

Machine translation of KR 20150076402, obtained Nov. 8, 2019 (Year: 2015).*

English translation of JP H1116571 obtained Feb. 24, 2020 (Year: 1999).*

Extended European Search Report for European Application No. 17847773.3, dated Sep. 23, 2019.

He et al., "Enhanced High-Rate Capability and Cycling Stability of Na-Stabilized Layered $Li_{1.2}[Co_{0.13}Ni_{0.13}Mn_{0.54}]O_2$ Cathode Material," *J. Mater. Chem. A*, 1 (11397-11403) Jul. 19, 2013.

Korean Intellectual Property Office, Office Action, dated Aug. 30, 2018, issued in Republic of Korea Patent Application No. 10-2017-0136614.

World Intellectual Property Organization, International Search Report dated Apr. 27, 2018, for International Patent Application No. PCT/KR2017/012536.

World Intellectual Property Organization, Written Opinion, dated Apr. 26, 2018, for International Patent Application No. PCT/KR2017/012536.

Office Action for Japanese Patent Application No. 2018-512596, dated Jan. 14, 2020 (w/English translation).

* cited by examiner

ELECTRODE PLATE INCLUDING NCM622
BEFORE ELECTROCHEMICAL EVALUATION

ELECTRODE PLATE INCLUDING NCM622 AFTER 200 CYCLES AT 60°C

|  | $D_{10}$ (μm) | $D_{50}$ (μm) | $D_{90}$ (μm) |
|---|---|---|---|
| PREPARATION EXAMPLE 1 | 2.8 | 6 | 11.1 |
| PREPARATION EXAMPLE 2 | 2.1 | 5.6 | 9.8 |
| PREPARATION EXAMPLE 3 | 2.2 | 4.6 | 7.5 |
| PREPARATION EXAMPLE 4 | 1.7 | 3.8 | 7.5 |
| PREPARATION EXAMPLE 5 | 2.0 | 4.0 | 6.5 |

POSITIVE ACTIVE MATERIAL FOR RECHARGEABLE LITHIUM BATTERY, METHOD OF PREPARING THE SAME, ELECTRODE INCLUDING THE SAME, AND RECHARGEABLE LITHIUM BATTERY INCLUDING THE ELECTRODE

TECHNICAL FIELD

The present disclosure relates to a cathode active material for a lithium secondary battery, a method of preparing the cathode active material, an electrode including the cathode active material, and a lithium secondary battery including the electrode.

BACKGROUND ART

Since the commercialization of lithium secondary batteries by Sony in 1991, the demand for rechargeable lithium batteries has been increasing in a variety of fields, from small electronic devices such as mobile phones and tablet PCs to medium- and large-sized electronic devices such as electric vehicles and energy storage systems. In particular, lithium secondary batteries (referred to also as rechargeable lithium batteries) for use in medium- and large-sized electronic devices need a high energy density. Monocrystalline $LiCoO_2$ (LCO), a currently commercially available cathode active material, is advantageous in that it is easily mass-produced, but cobalt used as a main ingredient is expensive.

Recently, Ni-based cathode active materials such as $LiNi_xCo_yMn_zO_2$ (NCM) and $LiNi_xCo_yAl_zO_2$ (NCA), having the same structure as LCO, are used as cathode active materials of lithium secondary batteries for use in medium- and large-sized electronic devices. These Ni-based cathode active materials may lead to reduced costs and increased reversible capacity due to partial substitution of costly cobalt with Ni.

Currently, a Ni-based cathode active material may be synthesized in a solid phase by mixing a lithium source and a precursor synthesized by co-precipitation. However, a Ni-based cathode active material synthesized via the conventional co-precipitation method is present in the form of secondary particles as agglomerates from small primary particles, such that micro-cracking may occur in between the secondary particles with repeated charging/discharging processes over a long period. This may generate newly exposed interfaces and accelerate side reactions with a liquid electrolyte at the exposed interfaces, leading to gas generation and electrolyte depletion, which consequently results in battery performance deterioration. To implement a high energy density, an electrode density needs to be increased (to greater than 3.3 g/cc), but this may cause disintegration of the secondary particles as well as depletion of the liquid electrolyte due to side reactions with the secondary particles, which consequently results in deterioration of initial lifetime characteristics.

Therefore, a Ni-based cathode active material in the form of secondary particles synthesized using the conventional co-precipitation method has a limitation in high energy density characteristics. In addition, an excessive residual lithium compound (LiOH, $Li_2CO_3$) on a surface of the Ni-based cathode active material may generate carbon dioxide gas during charging/discharging, which may significantly affect stability of the battery.

SUMMARY OF INVENTION

Technical Problem

The present disclosure provides a novel, monocrystalline nickel-rich cathode active material having a reduced residual lithium content, a high energy density, and long lifetime characteristics.

The present disclosure provides a cathode that has a high electrode density by including the cathode active material.

The present disclosure provides a lithium secondary battery that has a long lifetime and a high capacity by including the cathode.

Solution to Problem

According to an aspect of the present disclosure, there is provided a cathode active material for a lithium secondary battery, the cathode active material being monocrystalline and represented by Formula 1:

$$Li_xP_yNi_{1-a-b}Co_aA_bO_2 \qquad \text{<Formula 1>}$$

wherein, in Formula 1, $0.98 \leq x \leq 1.02$, $0 \leq y \leq 0.007$, $0 < a \leq 0.2$, $0 \leq b \leq 0.3$, and A is at least one element selected from Mn, Al, Mg, and V.

In some embodiments, the monocrystalline cathode active material may have a layered structure.

In some embodiments, the monocrystalline cathode active material may be provided as single particles.

In some embodiments, the monocrystalline cathode active material may have an average particle diameter greater than about 1.5 μm and smaller than or equal to about 18 μm.

In some embodiments, A in Formula 1 may comprise Mn, Al, or a combination thereof.

In some embodiments, in Formula 1, A may comprise Mn, and $0 < b \leq 0.3$.

In some embodiments, in Formula 1, A may comprise Al, and $0 < b \leq 0.05$.

In some embodiments, when y in Formula 1 is greater than 0, the P atom may be located at a tetrahedral site of a monocrystalline layered structure.

In some embodiments, when y in Formula 1 is greater than 0, the P atom may be located inside a monocrystalline layered structure.

According to an aspect of the present disclosure, there is provided a method of preparing a cathode active material for a lithium secondary battery, the method comprising: preparing a premixture of a lithium source and a transition metal source; mixing the premixture under an oxidizing atmosphere to thereby obtain a lithium transition metal-containing mixture; and thermally treating the lithium transition metal-containing mixture to thereby obtain a monocrystalline lithium transition metal composite oxide.

In some embodiments, the mixing may be performed using a mechanical mixing method.

In some embodiments, the premixture may further comprise a phosphorus source.

In some embodiments, the thermal treatment may include a first thermal treatment step and a second thermal treatment step.

In some embodiments, a thermal treatment temperature in the first thermal treatment step may be higher than a thermal treatment temperature in the second thermal treatment step.

In some embodiments, a thermal treatment time in the first thermal treatment step may be shorter than a thermal treatment time in the second thermal treatment step.

In some embodiments, the monocrystalline lithium transition metal composite oxide may be provided as single particles and may have a layered structure.

In some embodiments, the monocrystalline lithium transition metal composite oxide may have an average particle diameter of greater than 1.5 µm and less than 20 µm.

According to an aspect of the present disclosure, there is provided a cathode comprising the above-described monocrystalline cathode active material.

According to an aspect of the present disclosure, there is provided a lithium secondary battery comprising: the above-described cathode; a anode; and an electrolyte.

Advantageous Effects of Invention

By using the monocrystalline Ni-rich cathode active material according to one or more embodiments in a cathode of a lithium secondary battery, it is possible to implement a capacity per volume (mAh/cc) that is increased by about 20% over a conventional cathode active material which is polycrystalline or in the form of secondary particles.

In addition, by substituting P atoms into vacant sites in the tetrahedron in a structure of the monocrystalline Ni-rich cathode active material according to one or more embodiments, due to ensured phase stability and reduced residual lithium, battery stability and lifetime characteristics may be improved.

REFERENCE SIGNS LIST

Figure 1:
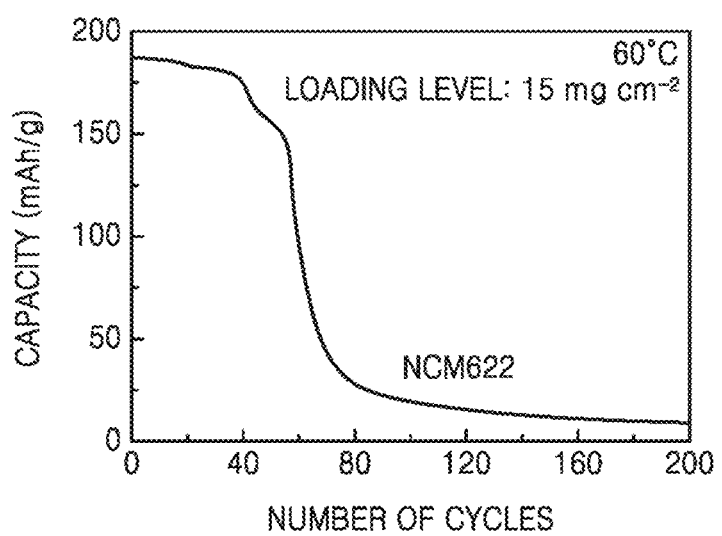
FIG. 1 is a graph illustrating a result of evaluation of lifetime at 60° C. of an electrode using a conventional secondary-particle-type cathode active material (NCM622) at an electrode density of about 3.6 g/cc.

| | |
|---|---|
| 1: lithium battery | 2: anode |
| 3: cathode | 4: separator |
| 5: battery case | 6: cap assembly |

DESCRIPTION OF EMBODIMENTS

The present inventive concept will now be described more fully with reference to the accompanying drawings, in which example embodiments are shown. The present inventive concept may, however, be embodied in many different forms, should not be construed as being limited to the embodiments set forth herein, and should be construed as including all modifications, equivalents, and alternatives within the scope of the present inventive concept; rather, these embodiments are provided so that this inventive concept will be thorough and complete, and will fully convey the effects and features of the present inventive concept and ways to implement the present inventive concept to those skilled in the art.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the drawings, the size or thickness of each layer, region, or element are arbitrarily exaggerated or reduced for better understanding or ease of description, and thus the present inventive concept is not limited thereto. Throughout the written description and drawings, like reference numbers and labels will be used to denote like or similar elements. It will also be understood that when an element such as a layer, a film, a region or a component is referred to as being "on" another layer or element, it can be "directly on" the other layer or element, or intervening layers, regions, or components may also be present. Although the terms "first", "second", etc., may be used herein to describe various elements, components, regions, and/or layers, these elements, components, regions, and/or layers should not be limited by these terms. These terms are used only to distinguish one component from another, not for purposes of limitation.

Figure 2:
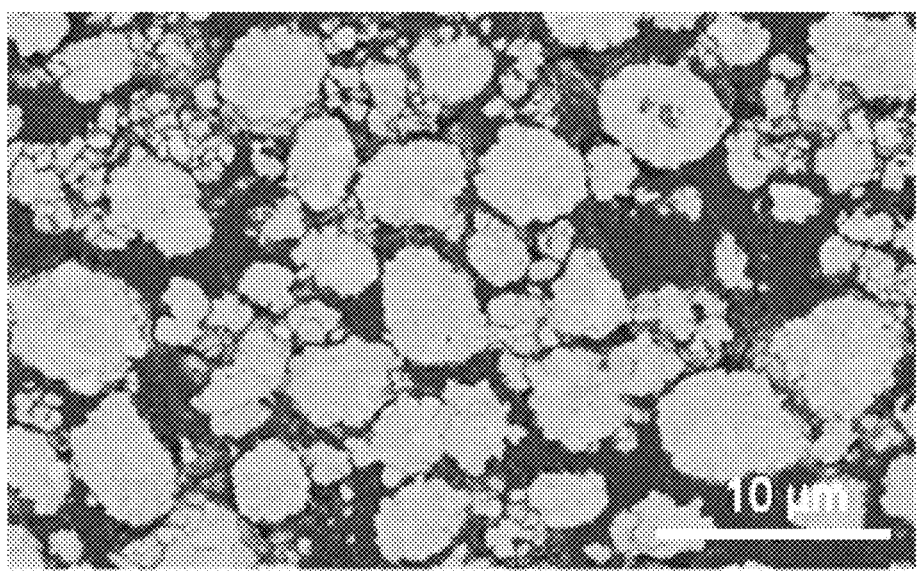
FIG. 2 shows scanning electron microscope (SEM) images before and after an electrochemical evaluation of the electrode using the conventional secondary-particle-type cathode active material (NCM622) at an electrode density of about 3.6 g/cc.
Figure 2:
Figure 2:
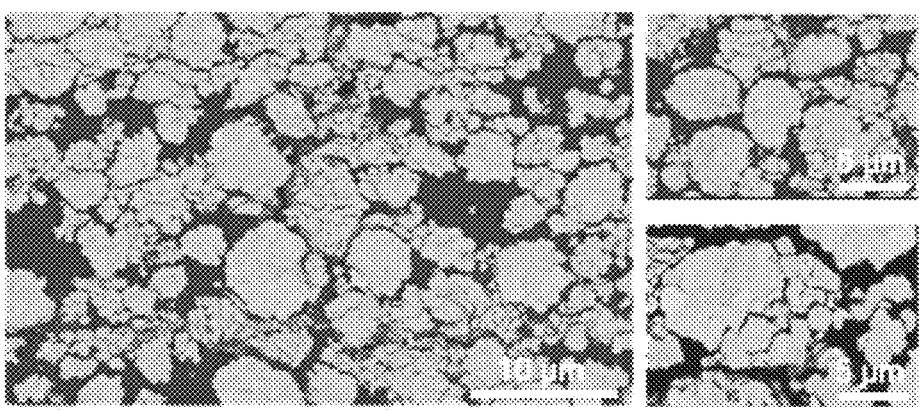

Prior to describing embodiments of a cathode active material and a lithium secondary battery using a cathode including the cathode active material, a Ni-based cathode active material for a secondary battery that may be synthesized using a conventional co-precipitation method will be described in brief with reference to FIGS. 1 and 2.

A Ni-based cathode active material for a secondary battery that is synthesized using a conventional co-precipitation method, is in the form of secondary particles as agglomerates from small primary particles. This may cause the secondary particles to disintegrate during roll-pressing of the electrode, leading to a limitation in increasing an electrode density. The conventional Ni-based cathode active material for a secondary battery, which is in the form of secondary particles, may have a maximum density of 3.6 g/cc after a pressing process. However, most of the secondary particles may disintegrate at this electrode density and undergo a side reaction with a liquid electrolyte during charging/discharging, leading to a deterioration in lifetime. This may finally lead to a sharp reduction in initial lifetime in an electrochemical evaluation of a half cell, and thus a limitation in increase of energy density per volume. NCM622 at an electrode density of about 3.6 g/cc may undergo a sharp reduction in reversible capacity after 40 cycles at 60° C. (see FIG. 1). Referring to FIG. 2, a secondary-particle-type active material $LiNi_{0.6}Co_{0.2}Mn_{0.2}O_2$ (NCM622) at an electrode density of about 3.6 g/cc may undergo disintegration of the secondary particles merely by being roll-pressed into smaller particles. Furthermore, after 200 charging and discharging cycles at about 60° C., almost all of the particles may be disintegrated, as apparent from the cross-sectional images of the secondary-particle-type active material (NCM622). This means that the disintegration of particles by electrode roll-pressing and the electrochemical disintegration of the particles may generate newly exposed interfaces of the cathode active material, accelerating side reactions with the electrolyte and gas generation during repeated charging and discharging charging, and thus may be a major cause of deterioration in battery lifetime and stability.

Hereinafter, embodiments of a monocrystalline cathode active material, which is free of the above-described drawbacks of the Ni-based cathode active material prepared using the conventional co-precipitation method, will be described in detail.

In accordance with an aspect of the present disclosure, there is provided a cathode active material for a lithium secondary battery, the cathode active material being monocrystalline and represented by Formula 1.

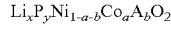   <Formula 1>

In Formula 1, 0.98≤x≤1.02, 0≤y≤0.007, 0<a≤0.2, 0≤b≤0.3, and A may be at least one element selected from Mn, Al, Mg, Ti, and V.

In some embodiments, in Formula 1, A may include Mn, Al, or a combination thereof. For example, A may include Mn, and 0<b≤0.3. For example, A may include Al, and 0<b≤0.05.

Figure 3:
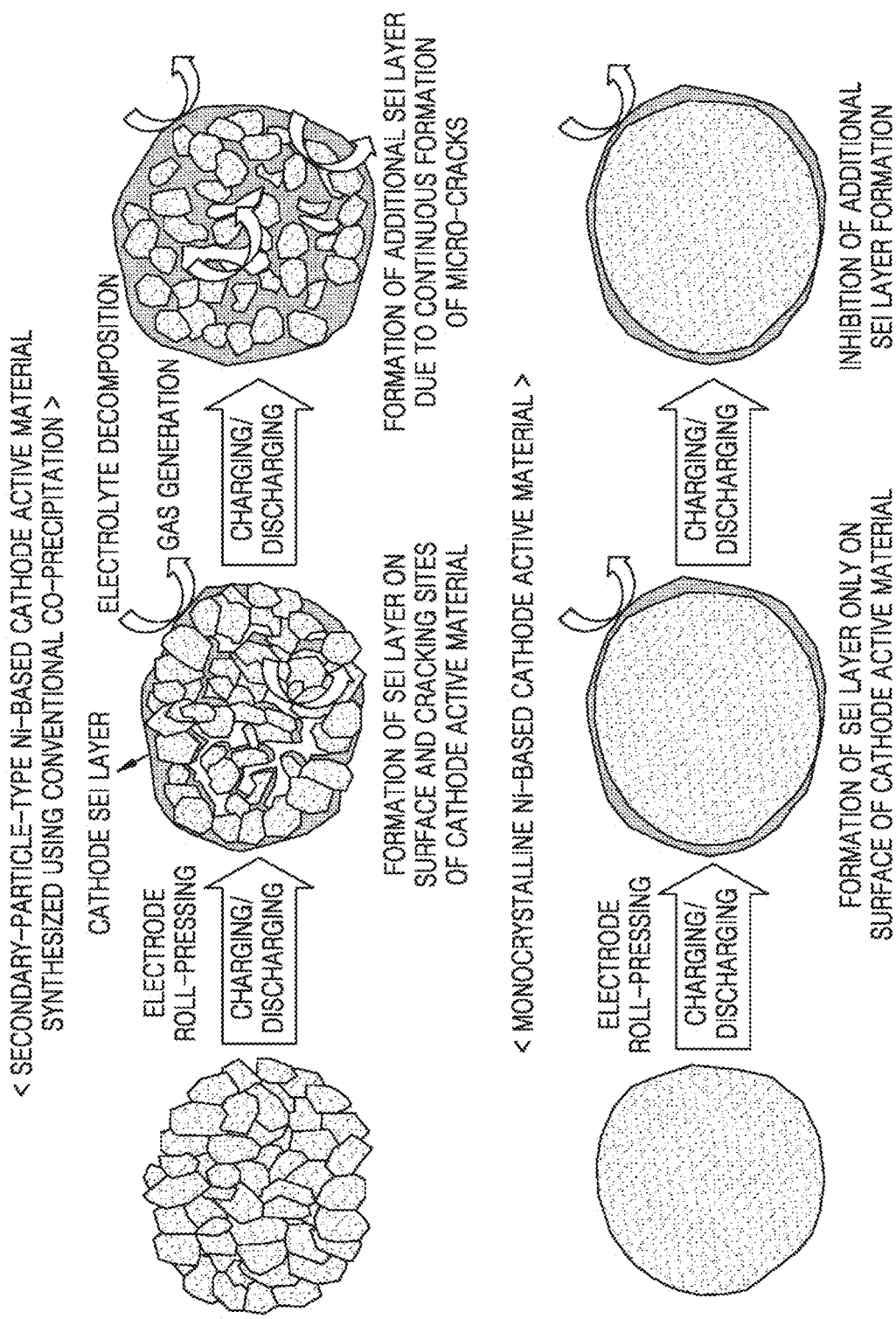
FIG. 3 comparatively illustrates a conventional secondary-particle-type Ni-based cathode active material and a monocrystalline Ni-based cathode active material prepared according to an embodiment.

As illustrated in FIG. 3, the monocrystalline cathode active material represented by Formula 1 may have a single crystal phase with a layered structure. Due to having a single phase, the monocrystalline cathode active material may have an increased structurally stable region available as an active material, and thus high capacity characteristics.

The cathode active material may be provided as single particles. In other words, the cathode active material according to one or more embodiments may not have a structural form including secondary particles agglomerated from small primary particles.

Since the cathode active material is in the form of single particles, the cathode active material may be prevented from being broken at a high electrode density. Accordingly, the cathode active material may implement a high energy density.

The cathode active material may have an average particle diameter (D50) of greater than 1.5 μm and equal to or less than 18 μm. However, the average particle diameter of the cathode active material is not limited to this range, and may be in any range of arbitrary two values within the range. When the cathode active material has an average particle diameter within this range, a certain energy density per volume may be implemented.

When the cathode active material has an average particle diameter greater than 18 μm, this may lead to a sharp reduction in charge and discharge capacity. When the cathode active material has an average particle diameter less than or equal to 1.5 μm, it may be difficult to obtain a desired energy density per volume.

In some embodiments, the cathode active material may include a small amount of phosphorous (P) as a doping element. For example, the cathode active material may be represented by Formula 2.

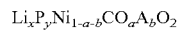   <Formula 2>

In Formula 1, 0.98≤x≤1.02, 0<y≤0.007, 0<a≤0.2, 0≤b≤0.3, and A may be at least one element selected from Mn, Al, Mg, Fe, Cu, Zn, Cr, and V.

The cathode active material represented by Formula 2, which is a monocrystalline, nickel-based single particle cathode active material, may have a structure in which vacant tetrahedral sites are doped with the element phosphorous (P), rather than being substituted with other elements in the crystalline structure. Accordingly, the doping of P does not affect the stoichiometric values of lithium (Li) or transition metals such as Ni and Co. Consequently, the monocrystalline, nickel-based cathode active material represented by Formula 2 may have a non-stoichiometric composition due to the introduction of P.

The cathode active material represented by Formula 2 may be doped with about 0.007 mole % or less of P.

In some embodiments, the P atom may be located at a tetrahedral site in the monocrystalline layered structure. The tetrahedral site may be a vacant site in the monocrystalline layered structure. As the P atom is located at a vacant tetrahedral site, residual lithium content may be reduced. While not limited to this theory, it is understood that the partial substitution of vacant sites in the regular tetrahedron with the P atom may inhibit the release of Li which may occur when oxygen defects are formed in the crystalline structure in a first thermal treatment step at a high temperature, thereby reducing residual lithium. Released lithium (Li) may form a residual lithium compound through reaction at a high temperature with $CO_2$ and moisture in the air. However, as the P atom present at vacant sites in the regular tetrahedron of the crystalline structure stabilizes an oxygen framework in the cathode structure, formation of oxygen defects at a high temperature may be inhibited, thus reducing the residual lithium.

Residual lithium from the cathode active material including P, which is water-soluble residual lithium (such as $Li_2CO_3$ and LiOH), may have a reduced content of about 20% to about 60% with respect to a residual lithium content (100%) of a cathode active material not including P, which was measured by a titration method (with 0.1M HCl) using a Metrohm 888 Titrando Titrator.

In some embodiments, the P atom may be present in the monocrystalline structure. For example, the P atom may not be present on a surface of the monocrystalline cathode active material, but may be inside the monocrystalline cathode active material.

As the P atom is located at a tetrahedral site in the monocrystalline structure, a phase transition according to intercalation/deintercalation of lithium ions during charging and discharging may be relieved. This may contribute to phase stability of the cathode active material.

Hereinafter, a method of preparing a monocrystalline cathode active material for a lithium secondary battery, according to one or more embodiments, will be described.

In accordance with another aspect of the present disclosure, a method of preparing a monocrystalline cathode active material according to one or more embodiments for a lithium secondary battery includes: preparing a premixture of a lithium source and a transition metal source; mixing the premixture under an oxidizing atmosphere to thereby obtain a lithium transition metal-containing mixture; and thermally treating the lithium transition metal-containing mixture to thereby obtain a monocrystalline lithium transition metal composite oxide.

In some embodiments, the lithium source may be LiOH or $Li_2CO_3$. However, embodiments are not limited thereto. The lithium source may include any of a variety of lithium-containing compounds which may supply the Li element.

In some embodiments, the transition metal source may be at least one compound selected from oxides or hydroxides of Ni, Co, Mn, Al, Mg, and V.

In some embodiments, the mixing of the premixture may be performed using a mechanical mixing method.

Mechanical mixing refers to grinding and mixing materials that are to be mixed together, by applying a mechanical force such as to form a uniform mixture. Mechanical mixing may be performed using a mixing device, for example, a ball mill using chemically inert beads, a planetary mill, a stirred ball mill, or a vibrating mill. To attain improved mixing effects, optionally a small amount of alcohol such as ethanol, or a higher fatty acid such as stearic acid may be added.

The mechanical mixing may be performed in an oxidizing atmosphere. This is to prevent reduction of a transition metal in the transition metal source (for example, a Ni compound) to thereby implement structural stability of the active material.

In some embodiments, the premixture may further include a phosphorus source. For example, the phosphorus source may be $NH_4HPO_4$. However, embodiments are not limited thereto. For example, the phosphorous source may include any of a variety of phosphorous-containing compounds which may supply P.

In some embodiments, the thermal treatment may include a first thermal treatment step and a second thermal treatment step. The first thermal treatment step and the second thermal treatment step may be continuously performed or may be performed with a rest period after the first thermal treatment step. The first thermal treatment step and the second thermal treatment step may be performed in the same chamber or in different separate chambers.

In some embodiments, a thermal treatment temperature in the first thermal treatment step may be higher than a thermal treatment temperature in the second thermal treatment step.

For example, the thermal treatment temperature of the first thermal treatment step may be about 850° C. to about 1200° C., and in some embodiments, about 860° C. to about 1200° C., and in some embodiments, about 870° C. to about 1200° C., and in some other embodiments, about 880° C. to about 1200° C., and in still other embodiments, about 890° C. to about 1200° C., and in yet still other embodiments, about 900° C. to about 1200° C. However, embodiments are not limited thereto. For example, the thermal treatment temperature of the first thermal treatment step may include any range of two values within each of these temperature ranges.

For example, the thermal treatment temperature of the second thermal treatment step may be about 700° C. to about 850° C., and in some embodiments, about 710° C. to about 850° C., and in some embodiments, about 720° C. to about 850° C., and in some other embodiments, about 730° C. to about 850° C., and in some other embodiments, about 740° C. to about 850° C., and in some other embodiments, about 750° C. to about 850° C., and in some other embodiments, about 700° C. to about 840° C., and in some other embodiments, about 700° C. to about 830° C., and in some other embodiments, about 700° C. to about 820° C., and in still other embodiments, about 700° C. to about 810° C., and in yet still other embodiments, about 700° C. to about 800° C. However, embodiments are not limited thereto. For example, the thermal treatment temperature of the second thermal treatment step may include any range of two values within each of these temperature ranges.

In some embodiments, a thermal treatment time of the first thermal treatment step may be shorter than a thermal treatment time of the second thermal treatment step.

For example, the thermal treatment time of the first thermal treatment step may be about 3 hours to about 5 hours, and in some embodiments, about 4 hours to about 5 hours, and in some other embodiments, about 3 hours to about 4 hours. However, embodiments are not limited thereto. For example, the thermal treatment time of the first thermal treatment step may include any range of two values within each of these ranges.

For example, the thermal treatment time of the second thermal treatment step may be about 10 hours to about 20 hours, and in some embodiments, about 10 hours to about 15 hours. However, embodiments are not limited thereto. For example, the thermal treatment temperature of the second thermal treatment step may include any range of two values within each of these ranges.

In some embodiments, the first thermal treatment step may include a thermal treatment step performed at a temperature of about 850° C. to about 1200° C. for about 3 hours to about 5 hours.

In some embodiments, the second thermal treatment step may include a thermal treatment step performed at a temperature of about 700° C. to about 850° C. for about 10 hours to about 20 hours.

In the first thermal treatment step, the lithium transition metal-containing mixture may form the cathode active material having a layered structure and at the same time induce growth of particles such that a monocrystalline form may be attained. In the first thermal treatment step, individual primary particles in the lithium transition metal-containing mixture present as secondary particles may rapidly grow, losing the ability to withstand against stress between the particles, such that the insides thereof are exposed and the exposed primary particles are fused together, thereby forming the monocrystalline cathode active material for a secondary battery. The second thermal treatment step may be performed at a temperature lower than the temperature of first thermal treatment step for a longer time, to thereby increase a degree of crystallinity of the layered structure formed in the first thermal treatment step. Through the first and second thermal treatment steps, a single-phase, monocrystalline, single-particle Ni-based cathode active material may be obtained.

In some embodiments, the monocrystalline lithium transition metal composite oxide prepared by the above-described preparation method may be single particles, and the single crystals may have a layered structure. The monocrystalline lithium transition metal composite oxide may have an average particle diameter of greater than 1.5 μm and less than or equal to 18 μm.

In some embodiments, in the method of preparing the monocrystalline cathode active material, a phosphorous-containing compound may be further added to the premixture to obtain a cathode active material in which vacant tetrahedral sites in the monocrystalline structure are partially substituted with phosphorous (P). This may inhibit phase transition during charging/discharging, and consequentially ensure battery stability and long lifetime characteristics.

In accordance with another aspect of the present disclosure, a cathode includes the cathode active material according to any of the above-described embodiments.

In accordance with another aspect of the present disclosure, a lithium secondary battery includes: the above-described cathode; a anode; and an electrolyte.

The cathode according to an embodiment and the lithium secondary battery according to an embodiment, including the cathode, may be manufactured in the following manner.

First, the cathode according to one or more embodiments may be manufactured as follows.

For example, the above-described cathode active material according to one or more embodiments, a conducting agent, a binder, and a solvent may be mixed together to prepare a cathode active material composition. In some embodiments, the cathode active material composition may be directly coated on a metallic current collector to form a cathode plate. In some embodiments, the cathode active material composition may be cast on a separate support to form a cathode active material film. This cathode active material film may then be separated from the support and laminated on a metallic current collector to thereby form a cathode plate. The cathode is not limited to the examples described above, and may be any of a variety of types.

The conducting agent may be, for example, graphite such as natural graphite or artificial graphite; carbon black; conductive tubes such as carbon nanotubes; conductive whiskers such as fluorocarbon, zinc oxide, and potassium titanate; or a conductive metal oxide such as titanium oxide. However, embodiments are not limited thereto. Any conducting agent available in the art may be used.

Examples of the binder are a vinylidene fluoride/hexafluoropropylene copolymer, polyvinylidene fluoride (PVDF), polyacrylonitrile, polymethylmethacrylate, polytetrafluoroethylene, mixtures thereof, metal salts thereof, and a styrene butadiene rubber polymer. However, embodiments are not limited thereto. Any material available as a binder in the art may be used. Other examples of the binder may be, for example, lithium salts, calcium salts, or sodium salts of the above-described polymers.

The solvent may be, for example, N-methylpyrrolidone, acetone or water. However, embodiments are not limited thereto. Any solvent available in the art may be used.

The amounts of the cathode active material, the conducting agent, the binder, and the solvent may be in ranges that are commonly used in lithium batteries. At least one of the conducting agent, the binder, and the solvent may be omitted according to the use and the structure of the lithium battery.

Next, an anode may be manufactured as follows.

For example, a anode active material, a conducting agent, a binder, and a solvent may be mixed together to prepare a anode active material composition. In some embodiments, the anode active material composition may be directly coated on a metallic current collector having a thickness of about 3 μm to about 500 μm and dried to form a anode plate. In some embodiments, the anode active material composition may be cast on a separate support to form a anode active material film. This anode active material film may then be separated from the support and laminated on a metallic current collector to thereby form a anode plate.

The current collector for the anode may be any one having conductivity and not causing a chemical change to a battery. For example, the current collector for the anode may be, for example, a copper foil, a nickel foil, or a copper foil of which surface is treated with carbon.

In some embodiments, the anode active material may be any anode active material for a lithium battery available in the art. For example, the anode active material may include at least one selected from lithium metal, a metal that is alloyable with lithium, a transition metal oxide, a non-transition metal oxide, and a carbonaceous material.

Examples of the metal alloyable with lithium may be Si, Sn, Al, Ge, Pb, Bi, Sb, a Si—Y alloy (where the element Y is an alkali metal, an alkali earth metal, a Group 13 element, a Group 14 element, a transition metal, a rare earth element, or a combination thereof, and Y is not Si), and a Sn—Y alloy (where the element Y is an alkali metal, an alkali earth metal, a Group 13 element, a Group 14 element, a transition metal, a rare earth element, or a combination thereof, and Y is not Sn). In some embodiments, the element Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), or tellurium (Te)

For example, the transition metal oxide may be a lithium titanium oxide, a vanadium oxide, or a lithium vanadium oxide.

For example, the non-transition metal oxide may be $SnO_2$ or $SiO_x$ (wherein $0<x<2$).

The carbonaceous material may be, for example, crystalline carbon, amorphous carbon, or a mixture thereof. Examples of the crystalline carbon may be graphite, such as natural graphite or artificial graphite that are in shapeless, plate, flake, spherical, or fibrous form. Examples of the amorphous carbon may be soft carbon (carbon sintered at low temperatures), hard carbon, meso-phase pitch carbides, and sintered cokes.

In some embodiments, the conducting agent, the binder, and the solvent used for the anode active material composition may be the same as those used for the cathode active material composition.

The amounts of the anode active material, the conducting agent, the binder, and the solvent may be the same levels generally used in the art for lithium batteries. At least one of the conducting agent, the binder, and the solvent may be omitted according to the use and the structure of the lithium battery.

Next, a separator that is to be disposed between the cathode and the anode may be prepared as follows.

The separator for the lithium battery may be any separator that is commonly used in lithium batteries. The separator may have low resistance to migration of ions in an electrolyte and have an excellent electrolyte-retaining ability. In some embodiments, the separator may be a single layer or a multilayer. Examples of the separator may be glass fiber, polyester, Teflon, polyethylene, polypropylene, polytetrafluoroethylene (PTFE), and a combination thereof, each of which may be in the form of a non-woven or woven fabric. For example, the separator may be a mixed multilayer, such as a two-layer separator of polyethylene/polypropylene, a three-layer separator of polyethylene/polypropylene/polyethylene, or a three-layer separator of polypropylene/polyethylene/polypropylene. For example, a rollable separator including polyethylene or polypropylene may be used for a lithium ion battery. A separator with a good organic electrolyte-retaining ability may be used in a lithium ion polymer battery. For example, the separator may be manufactured in the following manner.

In some embodiments, a polymer resin, a filler, and a solvent may be mixed together to prepare a separator composition. Then, the separator composition may be directly coated on an electrode, and then dried to thereby form the separator. In some embodiments, the separator composition may be cast on a support and then dried to form a separator film, which may then be separated from the support and laminated on an electrode to thereby form the separator.

The polymer resin used to manufacture the separator may be any material that is commonly used as a binder for electrode plates. Examples of the polymer resin may be a vinylidenefluoride/hexafluoropropylene copolymer, polyvinylidene fluoride (PVDF), polyacrylonitrile, polymethylmethacrylate, and a mixture thereof.

Next, an electrolyte may be prepared as follows.

In some embodiments, the electrolyte may be an organic liquid electrolyte. In some embodiments, the electrolyte may be in a solid phase. Examples of the electrolyte may be lithium oxide and lithium oxynitride. Any material available as a solid electrolyte in the art may be used. In some embodiments, the solid electrolyte may be formed on the anode by, for example, sputtering.

In some embodiments, the organic liquid electrolyte may be prepared by dissolving a lithium salt in an organic solvent.

The organic solvent may be any solvent available as an organic solvent in the art. Examples of the organic solvent may be cyclic carbonates, such as propylene carbonate, ethylene carbonate, fluoroethylene carbonate, butylene carbonate, and vinylene carbonate; chain carbonates such as dimethylcarbonate, diethylcarbonate, methylethyl carbonate, methylpropyl carbonate, ethylpropyl carbonate, methylisopropyl carbonate, dipropyl carbonate, and dibutyl carbonate; esters, such as methyl acetate, ethyl acetate, propyl acetate, methyl propionate, ethyl propionate, and γ-butyrolactone; ethers, such as 1,2-dimethoxyethane, 1,2-diethoxyethane, tetrahydrofuran, 1,2-dioxane, and 2-methyltetrahydrofuran; nitriles such as acetonitrile; and amides such as dimethyl formamide. These examples of the organic solvent may be used alone or in combination. For example, the organic solvent may be a mixed solvent of a cyclic carbonate and a chain carbonate.

In some other embodiments, the electrolyte may be a gel type polymer electrolyte which may be obtained by impregnating a polymer electrolyte such as polyethylene oxide or polyacrylonitrile with a liquid electrolyte, or an inorganic solid electrolyte such as LiI, $Li_3N$, $Li_xGe_yP_zS_\alpha$, or $Li_xGe_yP_zS_\alpha X_\delta$ (wherein X may be F, Cl, or Br).

In some embodiments, the lithium salt may be any material available as a lithium salt in the art. In some embodiments, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are each independently a natural number), LiCl, LiI, or a mixture thereof.

Figure 9:
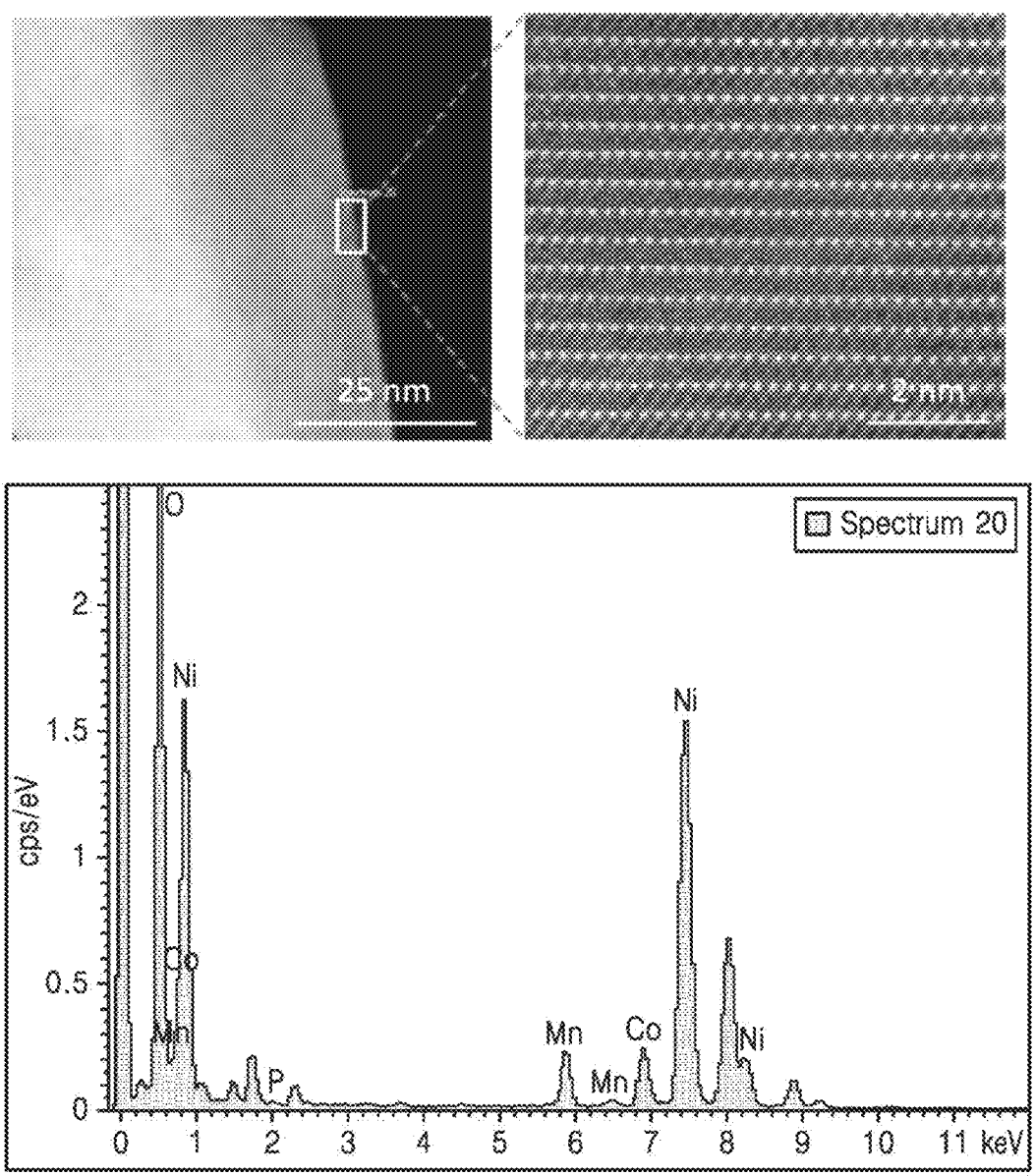
FIG. 9 shows scanning transmission electron microscope (STEM) images and results of energy-dispersive X-ray spectroscopy (EDS) of the cathode active material of Preparation Example 10.

Referring to FIG. 9, a lithium battery 1 according to an embodiment may include a cathode 3, a anode 2, and a separator 4. The cathode 3, the anode 2, and the separator 4 may be wound or folded, and then accommodated in a battery case 5. Then, after an organic liquid electrolyte is injected into the battery case 5, the battery case 5 may then be sealed with a cap assembly 6, thereby completing the manufacture of the lithium battery 1. The battery case 5 may be, for example, a cylindrical type, a rectangular type, or a thin-film type. For example, the lithium battery 1 may be a thin-film type battery. The lithium battery 1 may be, for example, a lithium ion battery.

In some embodiments, the separator may be disposed between the cathode and the anode to form a battery assembly. In some embodiments, the battery assembly may be stacked to form a bi-cell structure, which may then be impregnated with the organic liquid electrolyte. The resulting battery assembly structure may be put into a pouch and hermetically sealed, to thereby manufacture a lithium ion polymer battery.

In some embodiments, a plurality of battery assemblies may be stacked on one another to form a battery pack. This battery pack may be used in any device that requires high capacity and high output, for example, in a laptop computer, a smart phone, or an electric vehicle.

The lithium battery may have improved lifetime characteristics and high rate characteristics, and thus may be used in an electric vehicle (EV), for example, in a hybrid vehicle such as a plug-in hybrid electric vehicle (PHEV). The lithium battery may be applicable to the high-power storage field. For example, the lithium battery may be used in an electric bicycle or a power tool.

EXAMPLES

Preparation of Cathode Active Material

Preparation Example 1

100 g of $Ni_{0.5}Co_{0.2}Mn_{0.3}(OH)_2$ and 40.7 g of $Li_2CO_3$ were mechanically mixed for about 15 minutes. The resulting mixed powder was calcined at about 1150° C. for 4 hours and then at about 780° C. for about 10 hours to thereby obtain a monocrystalline $LiNi_{0.5}Co_{0.2}Mn_{0.3}O_2$ (NCM523).

Preparation Example 2

100 g of $Ni_{0.6}Co_{0.2}Mn_{0.2}(OH)_2$ and 40.8 g of $Li_2CO_3$ were mechanically mixed for about 15 minutes. The resulting mixed powder was loaded into an alumina crucible and calcined at about 1100° C. for about 4 hours and then at about 780° C. for about 10 hours to thereby obtain a monocrystalline LiNi$_{0.6}$Co$_{0.2}$Mn$_{0.2}$O$_2$ (NCM622).

Preparation Example 3

100 g of Ni$_{0.8}$Co$_{0.1}$Mn$_{0.1}$(OH)$_2$ and 40.6 g of Li$_2$CO$_3$ were mechanically mixed for about 15 minutes. The resulting mixed powder was loaded into an alumina crucible and calcined at about 970° C. for about 4 hours and then at about 780° C. for about 10 hours to thereby obtain a monocrystalline LiNi$_{0.8}$Co$_{0.1}$Mn$_{0.1}$O$_2$ (NCM811).

Preparation Example 4

100 g of Ni$_{0.8}$Co$_{0.15}$Al$_{0.05}$(OH)$_2$ and 40.8 g of Li$_2$CO$_3$ were mechanically mixed for about 15 minutes. The resulting mixed powder was loaded into an alumina crucible and calcined at about 920° C. for about 4 hours and then at about 780° C. for about 10 hours to thereby obtain a monocrystalline LiNi$_{0.8}$Co$_{0.15}$Al$_{0.05}$O$_2$ (NCA).

Preparation Example 5

100 g of Ni$_{0.9}$Co$_{0.1}$(OH)$_2$ and 40.4 g of Li$_2$CO$_3$ were mechanically mixed for about 15 minutes. The resulting mixed powder was loaded into an alumina crucible and calcined at about 880° C. for about 4 hours and then at about 780° C. for about 10 hours to thereby obtain LiNi$_{0.9}$Co$_{0.1}$O$_2$ (NC).

Preparation Example 6

100 g of Ni$_{0.8}$Co$_{0.1}$Mn$_{0.1}$(OH)$_2$, 40.7 g of Li$_2$CO$_3$, and 0.0617 g of NH$_4$HPO$_4$ were mechanically mixed for about 15 minutes. The resulting mixed powder was loaded into an alumina crucible and calcined at about 970° C. for about 4 hours and then at about 780° C. for about 10 hours to thereby obtain LiNi$_{0.795}$Co$_{0.101}$Mn$_{0.103}$P$_{0.0002}$O$_2$.

Preparation Example 7

100 g of Ni$_{0.8}$Co$_{0.1}$Mn$_{0.1}$(OH)$_2$, 40.7 g of Li$_2$CO$_3$, and 0.123 g of NH$_4$HPO$_4$ were mechanically mixed for about 15 minutes. The resulting mixed powder was loaded into an alumina crucible and calcined at about 970° C. for about 4 hours and then at about 780° C. for about 10 hours to thereby obtain LiNi$_{0.794}$Co$_{0.102}$Mn$_{0.103}$P$_{0.0004}$O$_2$.

Preparation Example 8

100 g of Ni$_{0.8}$Co$_{0.1}$Mn$_{0.1}$(OH)$_2$, 40.7 g of Li$_2$CO$_3$, and 0.370 g of NH$_4$HPO$_4$ were mechanically mixed for about 15 minutes. The resulting mixed powder was loaded into an alumina crucible and calcined at about 970° C. for about 4 hours and then at about 780° C. for about 10 hours to thereby obtain LiNi$_{0.794}$Co$_{0.101}$Mn$_{0.103}$P$_{0.0016}$O$_2$.

Preparation Example 9

100 g of Ni$_{0.8}$Co$_{0.1}$Mn$_{0.1}$(OH)$_2$, 40.7 g of Li$_2$CO$_3$, and 0.617 g of NH$_4$HPO$_4$ were mechanically mixed for about 15 minutes. The resulting mixed powder was loaded into an alumina crucible and calcined at about 970° C. for about 4 hours and then at about 780° C. for about 10 hours to thereby obtain LiNi$_{0.792}$Co$_{0.101}$Mn$_{0.103}$P$_{0.003}$O$_2$.

Preparation Example 10

100 g of Ni$_{0.8}$Co$_{0.1}$Mn$_{0.1}$(OH)$_2$, 40.7 g of Li$_2$CO$_3$, and 1.23 g of NH$_4$HPO$_4$ were mechanically mixed for about 15 minutes. The resulting mixed powder was loaded into an alumina crucible and calcined at about 970° C. for about 4 hours and then at about 780° C. for about 10 hours to thereby obtain LiNi$_{0.79}$Co$_{0.10}$Mn$_{0.103}$P$_{0.0064}$O$_2$.

Preparation Example 11

100 g of Ni$_{0.8}$Co$_{0.1}$Mn$_{0.1}$(OH)$_2$ and 45.8 g of LiOH were mechanically mixed for about 15 minutes, and then calcined at about 780° C. for about 20 hours to thereby obtain LiNi$_{0.8}$Co$_{0.1}$Mn$_{0.1}$O$_2$ (NCM811) in the form of secondary particles.

Preparation Example 12

100 g of Ni$_{0.8}$Co$_{0.15}$Al$_{0.05}$(OH)$_2$ and 45.8 g of LiOH were mechanically mixed for about 15 minutes, and then calcined at about 780° C. for about 20 hours to thereby obtain LiNi$_{0.8}$Co$_{0.15}$Al$_{0.05}$O$_2$ (NCA) in the form of secondary particles.

(Manufacturing of Half Cell)

Example 1

The cathode active material obtained in Preparation Example 1, a conducting agent, and a binder were mixed in a weight ratio of about 94:3:3 to prepare a slurry. The conducting agent used was carbon black, and the binder used was obtained by dissolving polyvinylidene fluoride (PVdF) in a N-methyl-2-pyrrolidone solvent.

The slurry was uniformly applied onto an aluminum (Al) current collector, and then dried at about 110° C. for about 2 hours to thereby manufacture a cathode. A loading level of the electrode plate was about 11.0 mg/cm$^2$, and an electrode density was about 3.6 g/cc.

By using the manufactured cathode as a working electrode, a lithium foil as a counter electrode, and a liquid electrolyte prepared by adding 1.3M LiPF$_6$ as a lithium salt to a mixed solvent of EC/EMC/DEC in a volume ratio of about 3:4:3, a CR2032 half cell was manufactured according to a commonly known process.

Examples 2 to 10

Half cells were manufactured in the same manner as in Example 1, except that the cathode active materials of Preparation Examples 2 to 10 were used.

Comparative Examples 1 and 2

Half cells were manufactured in the same manner as in Example 1, except that the cathode active materials of Preparation Examples 11 and 12 were used. The electrode used in the half cell had an electrode density of about 2.7 g/cc.

Figure 4:
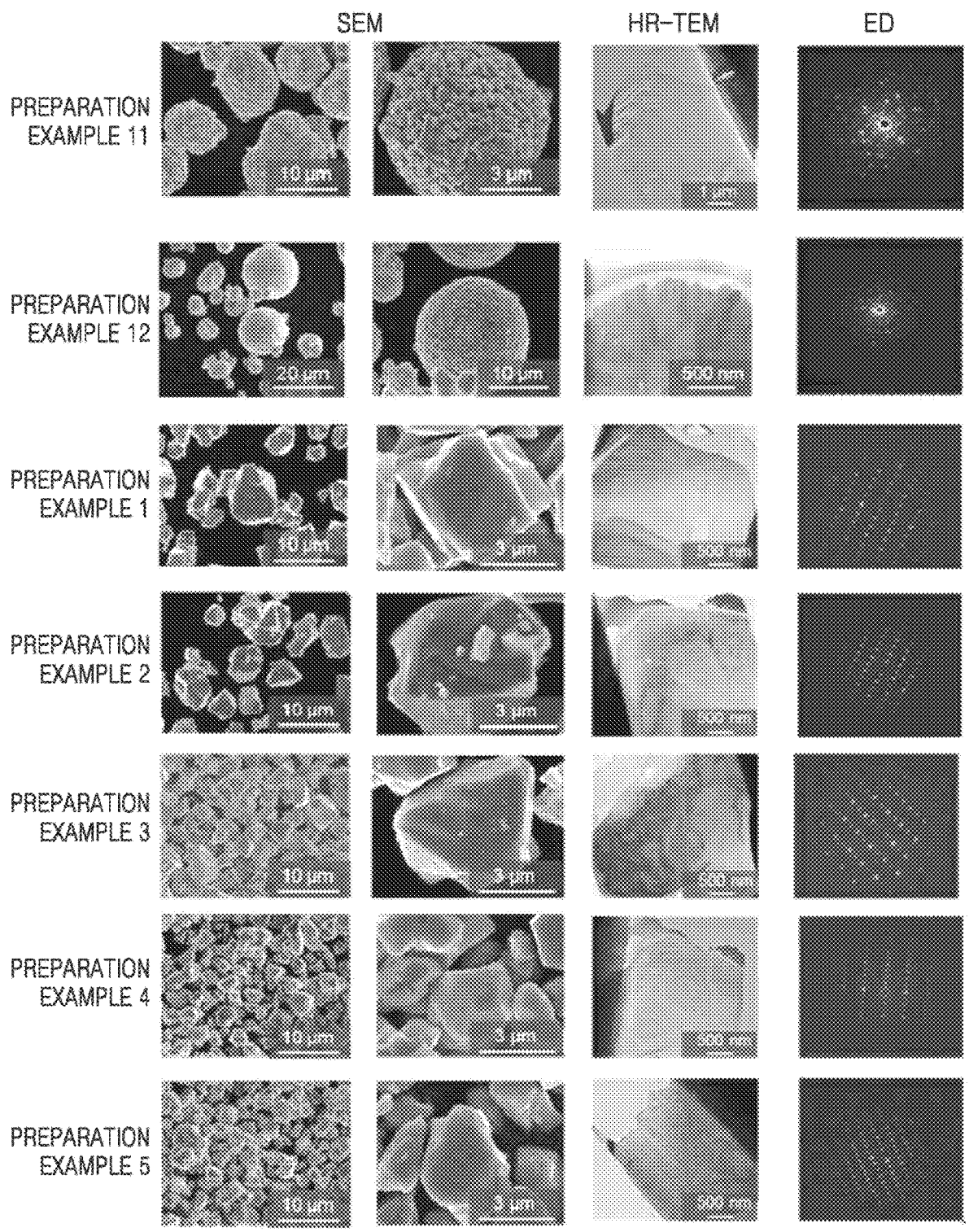
FIG. 4 shows SEM images, high-resolution transmission electron microscope (HR-TEM) images, and electron diffraction (ED) images of cathode active materials of Preparation Examples 1 to 5 and Preparation Examples 11 and 12.
Figure 5:
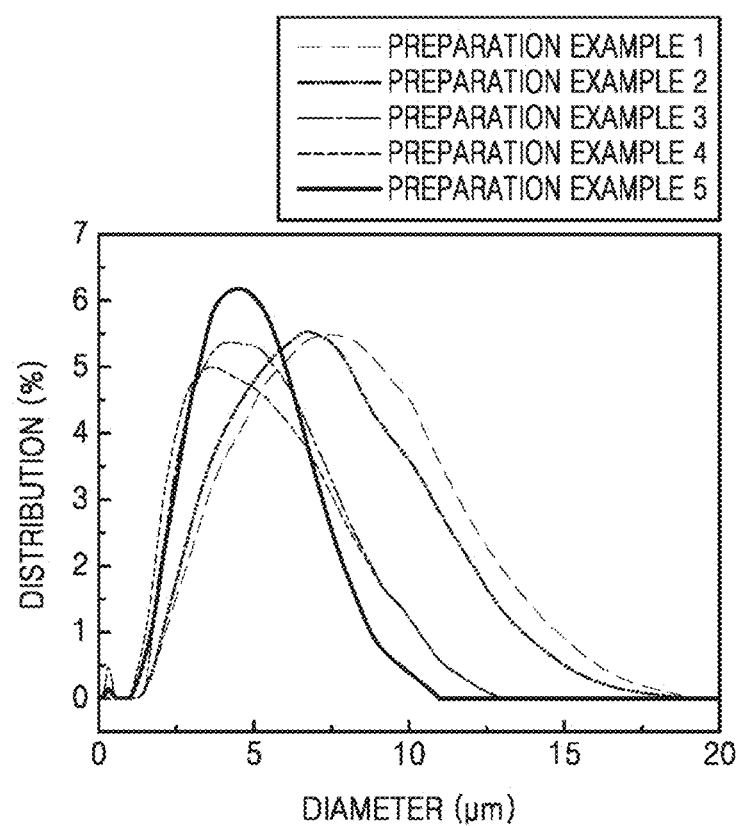
FIG. 5 shows evaluation results of particle size distribution of the cathode active materials of Preparation Examples 1 to 5.

Evaluation Examples (1) Evaluation of Cathode Active Material Surface and Particle Size Referring to FIGS. 4 and 5, the cathode active materials obtained in Preparation Examples 11 and 12 were found to be in the form of secondary particles as agglomerates of small primary particles and exhibit an irregular electron diffraction (ED) pattern with various crystal orientations due to the polycrystalline properties of the primary particles, as analyzed by high-resolution transmission electron microscopy (HR-TEM) and electron diffraction (ED) analysis. In contrast, the cathode active materials prepared in Preparation Examples 1 to 5 were found to exist as single particles and exhibit a single pattern of a layered structure (Zone axis: $[110]_c$), due to one orientation direction, as analyzed by HR-TEM and ED analysis. The cathode active materials of Preparation Examples 1 to 5 had a particle size distribution between about 1.5 μm to about 18 μm. The HR-TEM was performed using a JEM-ARM300F (JEOL) at an accelerated voltage of about 160 kV, and the particle size distribution analysis was performed using a particle size analyzer (Cilas1090, Scinco).

Figure 6:
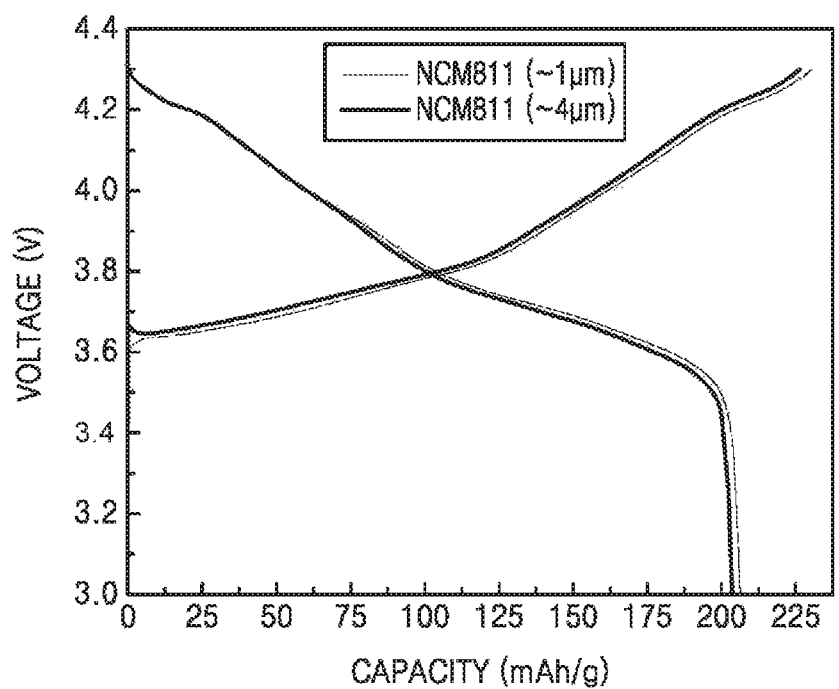
FIG. 6 is a graph illustrating charge-discharge characteristics of cathode active materials (NCM811) having average particle diameters of about 1 µm and about 4 µm, respectively.
Figure 7:
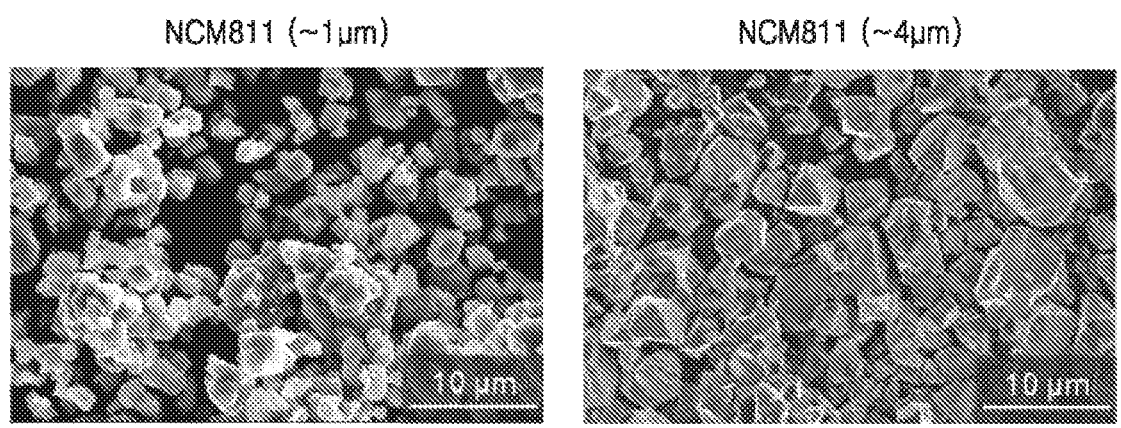
FIG. 7 shows SEM images of surfaces of the cathode active materials (NCM811) having average particle diameters of about 1 µm and about 4 µm, respectively.

(2) Energy Density Per Volume with Respect to Cathode Active Material Particle Size A cathode active material (NCM 811) having an average particle diameter of about 1 μm was prepared in the same manner as in Preparation Example 3, except that calcination was performed under the thermal treatment condition of about 910° C. for about 4 hours and about 780° C. for about 10 hours. A cathode active material (NCM 811) having an average particle diameter of about 4 μm was prepared in the same manner as in Preparation Example 3, except that calcination was performed under the thermal treatment condition of about 910° C. for about 4 hours and about 780° C. for about 10 hours. Electrodes were manufactured using these cathode active materials, respectively, and a maximum electrode density and an energy density per volume of each of the electrodes were measured. The results are shown in FIG. 6 and Table 1. A surface of each of the electrodes was analyzed by scanning electron microscopy (SEM). The results are shown in FIG. 7.

TABLE 1

| Average particle diameter ($D_{50}$) | Maximum electrode density | Energy density per volume |
| --- | --- | --- |
| 1 μm | 3.2 g/cc | 662 Wh/cc |
| 4 μm | 3.7 g/cc | 755 Wh/cc |

Referring to Table 1, the maximum electrode density and the energy density per volume when the average particle diameter was about 1 μm were smaller, compared to those when the average particle diameter was about 4 μm.

(3) Comparative Evaluation of Residual Lithium Content with Respect to P Content in Cathode Active Material Crystal The cathode active material of Preparation Example 3 and the cathode active materials of Preparation Examples 6 to 10 were analyzed by inductively coupled plasma spectroscopy (ICP) using a 700-ES (Varian). The results are shown in Table 2. Residual lithium contents in the cathode active materials of Preparation Example 3 and Preparation Examples 6 to 10 were measured. The results are shown in Table 3.

TABLE 2

|  | Li | Ni | Co | Mn | P |
| --- | --- | --- | --- | --- | --- |
| Preparation Example 3 | 1.00 | 79.4 | 10.2 | 10.3 | 0 |
| Preparation Example 6 | 1.00 | 79.5 | 10.1 | 10.3 | 0.0002 |
| Preparation Example 7 | 1.00 | 79.4 | 10.2 | 10.3 | 0.0004 |
| Preparation Example 8 | 1.00 | 79.4 | 10.1 | 10.3 | 0.0016 |
| Preparation Example 9 | 1.00 | 79.2 | 10.1 | 10.3 | 0.0030 |

TABLE 2-continued

|  | Li | Ni | Co | Mn | P |
| --- | --- | --- | --- | --- | --- |
| Preparation Example 10 | 1.00 | 79.0 | 10.0 | 10.3 | 0.0064 |

TABLE 3

|  | $Li_2CO_3$ (wt %) | LiOH (wt %) |
| --- | --- | --- |
| Preparation Example 3 | 1.94 | 0.07 |
| Preparation Example 6 | 1.41 | 0.04 |
| Preparation Example 7 | 1.33 | 0.05 |
| Preparation Example 8 | 1.21 | 0.08 |
| Preparation Example 9 | 0.97 | 0.04 |
| Preparation Example 10 | 0.90 | 0.01 |

Referring to Tables 2 and 3, the cathode active materials of Preparation Examples 6 to 10, containing P, were found to have reduced residual lithium contents. It can be seen that, as the P content increased, the residual lithium content decreased.

Figure 8:
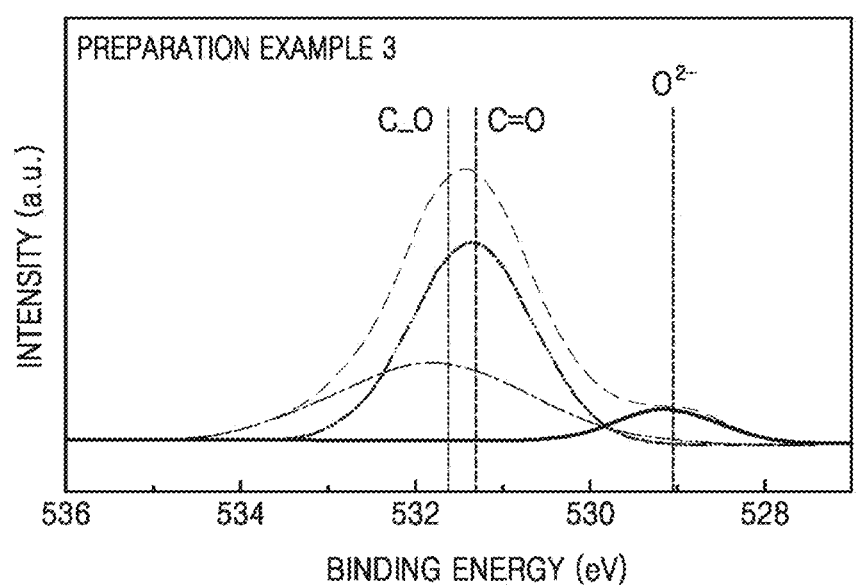
FIG. 8 shows graphs illustrating results of X-ray photoelectron spectroscopy (XPS) of cathode active materials of Preparation Example 3 and Preparation Example 10.
Figure 8:
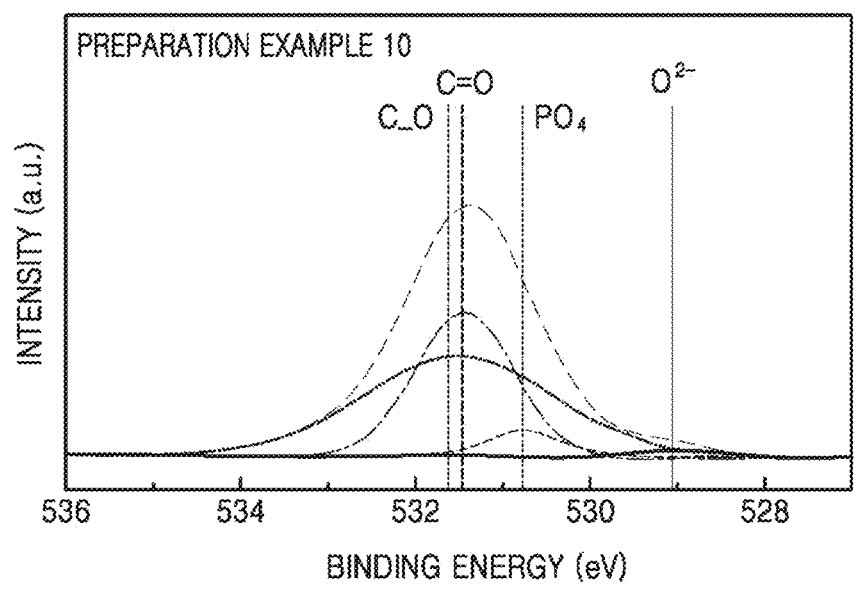

To identify locations of the P atom in cathode active materials, the cathode active materials of Preparation Examples 3 and 10 were analyzed by X-ray photoelectron spectroscopy (XPS). The results are shown in FIG. 8. In addition, particle surfaces of the cathode active material of Preparation Example 10 were analyzed by scanning transmission electron microscopy (STEM) and by scanning transmission electron microscopy-energy dispersive X-ray spectroscopy (STEM-EDS). The results are shown in FIG. 9.

According to the ICP analysis results, the cathode active materials of Preparation Examples 6 to 10 were found to have slightly reduced transition metal contents, compared to the cathode active material of Preparation Example 3, indicating the substitution of P at transition metal sites. Referring to FIG. 8, as a result of the XPS analysis, no P—O bond appeared in the cathode active material of Preparation Example 3, while a $PO_4$ group was found in the cathode active material of Preparation Example 10. In this regard, according to prior art documents, it is known that P may partially form a $PO_4$ framework by being substituted into the structure of the cathode active material. This means that, in the cathode active material having a layered structure for use in a lithium secondary battery, P, which is able to form coordinate bonds in a regular tetrahedron, may be located at a vacant site of a regular tetrahedron, not at the octahedral sites in which lithium and transition metals form coordinate bonds.

Referring to FIG. 9, any coating material was not observed on particle surfaces, and the particle surfaces were found to have a layered structure. According to the EDS results, the P atom was observed in a region defined by a white rectangular box in FIG. 9, indicating the presence of the P atom in the structure of the cathode active material.

(4) Electrochemical Evaluation

For an initial formation evaluation, after a rest period for about 10 hours, the half cells manufactured in Examples 1 to 10 and Comparative Examples 1 and 2 were each charged in a constant current (CC) mode at about 0.1 C until a voltage of about 4.3V was reached and then in a constant voltage (CV) mode with a current corresponding to about 0.05 C, and then discharged in a CC mode at about 0.1 C until a voltage of about 3.0V was reached. To evaluate lifetime characteristics at room temperature, each cell was charged in a CC mode at about 0.5 C until a voltage of about 4.3V was reached, and then in a CV mode with a voltage corresponding to about 0.05 C, and then discharged in a CC mode at about 1 C until a voltage of about 3.0V was reached. This charging and discharging cycle was repeated 80 times in total.

Initial formation capacities and initial Coulombic efficiencies of the half cells of Examples 1 to 10 and Comparative Examples 1 and 2 were measured. Capacity retentions of the half cells of Example 3, Examples 6 to 10, and Comparative Examples 1 and 2 were measured. The results are shown in Tables 4 to 6 and FIGS. 10 to 12.

TABLE 4

| Secondary-particle-type Ni-based cathode active material | | Monocrystalline Ni-based cathode active material | | |
|---|---|---|---|---|
| | Initial formation capacity (mAh/g) | | Initial formation capacity (mAh/g) | Initial Coulombic efficiency (%) |
| NCM523 | 172 | Example 1 | 173 | 90 |
| NCM622 | 180 | Example 2 | 181 | 90 |
| NCM811 (Comparative Example 1) | 199 | Example 3 | 202 | 89 |
| NCA (Comparative Example 2) | 204 | Example 4 | 205 | 90 |
| NC9010 | 217 | Example 5 | 216 | 89 |

TABLE 5

| $Li_xP_\delta Ni_{1-y-z}Co_yMn_zO_\alpha$ (y = z = 0.1) | | Initial formation characteristics | |
|---|---|---|---|
| | | Formation capacity (mAh/g) | Initial Coulombic efficiency (%) |
| δ = 0 | Example 3 | 202 | 89 |
| δ = 0.0002 | Example 6 | 203 | 89 |
| δ = 0.0004 | Example 7 | 203 | 89 |
| δ = 0.0016 | Example 8 | 202 | 89 |
| δ = 0.0030 | Example 9 | 199 | 87 |
| δ = 0.0064 | Example 10 | 192 | 86 |

TABLE 6

| | $Li_xP_\delta Ni_{1-y-z}Co_yMn_zO_\alpha$ (y = z = 0.1) | | Lifetime at room temperature Cycle retention (%) |
|---|---|---|---|
| Secondary particles | Comparative Example 1 | | 73 |
| | Comparative Example 2 | | 77 |
| Single crystals | δ = 0 | Example 3 | 84 |
| | δ = 0.0002 | Example 6 | 86 |
| | δ = 0.0004 | Example 7 | 87 |
| | δ = 0.0016 | Example 8 | 88 |
| | δ = 0.0030 | Example 9 | 88 |
| | δ = 0.0064 | Example 10 | 88 |

Figure 10:
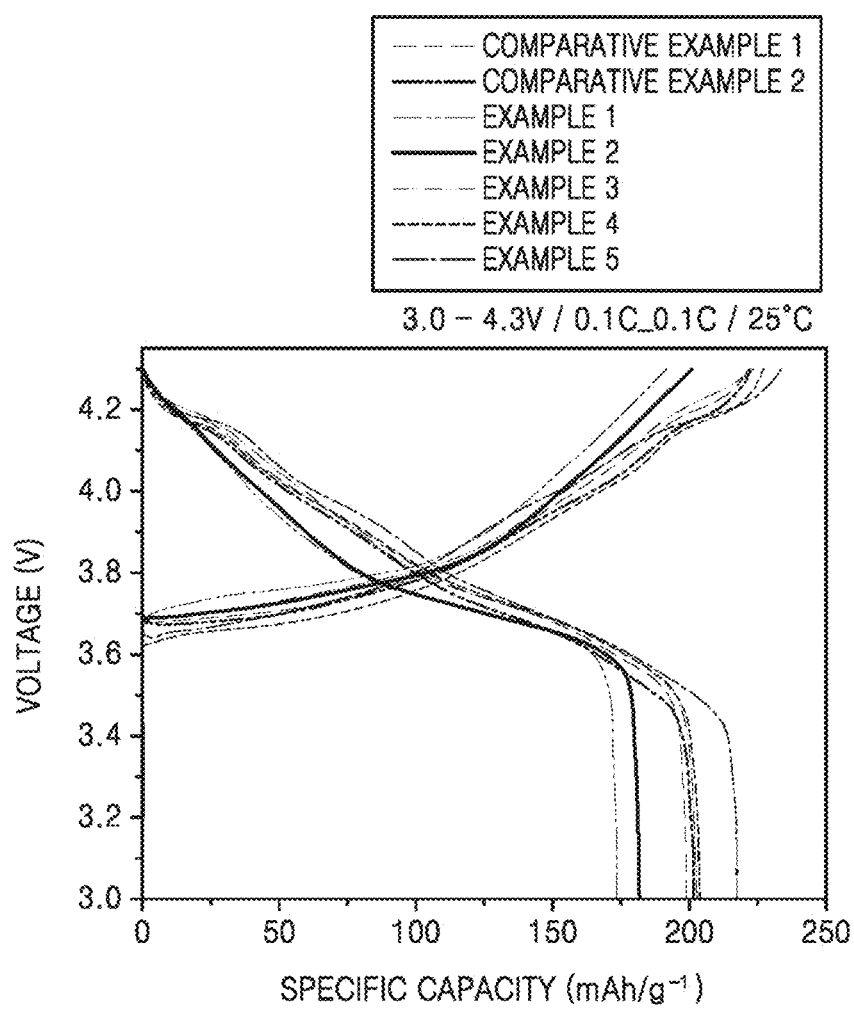
FIG. 10 is a graph illustrating charge and discharge curves of half cells according to Examples 1 and 2 and Comparative Examples 1 and 2.

Referring to Table 4 and FIG. 10, the half cells of Examples 1 to 5 including the monocrystalline Ni-based cathode active materials for a lithium secondary battery had an initial capacity similar to the half cells of Comparative Examples 1 and 2 using the Ni-based cathode active materials in the form of secondary particles having the same compositions.

Monocrystalline cathode active materials for a lithium secondary battery that have been reported thus far are known to provide a smaller initial reversible capacity compared to secondary-particle-type cathode active materials having the same compositions. This is because excess lithium (Li>1.15) is introduced into a structure of a monocrystalline cathode active material during synthesis, such that phase stability is not ensured. According to the present disclosure, a mole % of a lithium source with respect to a transition metal is stoichiometrically controlled to be exactly 1 to thereby prepare a structurally perfect monocrystalline cathode active material for a lithium secondary battery, having a capacity equal to or greater than that of a secondary-particle-type cathode active material having the same composition.

Figure 11:
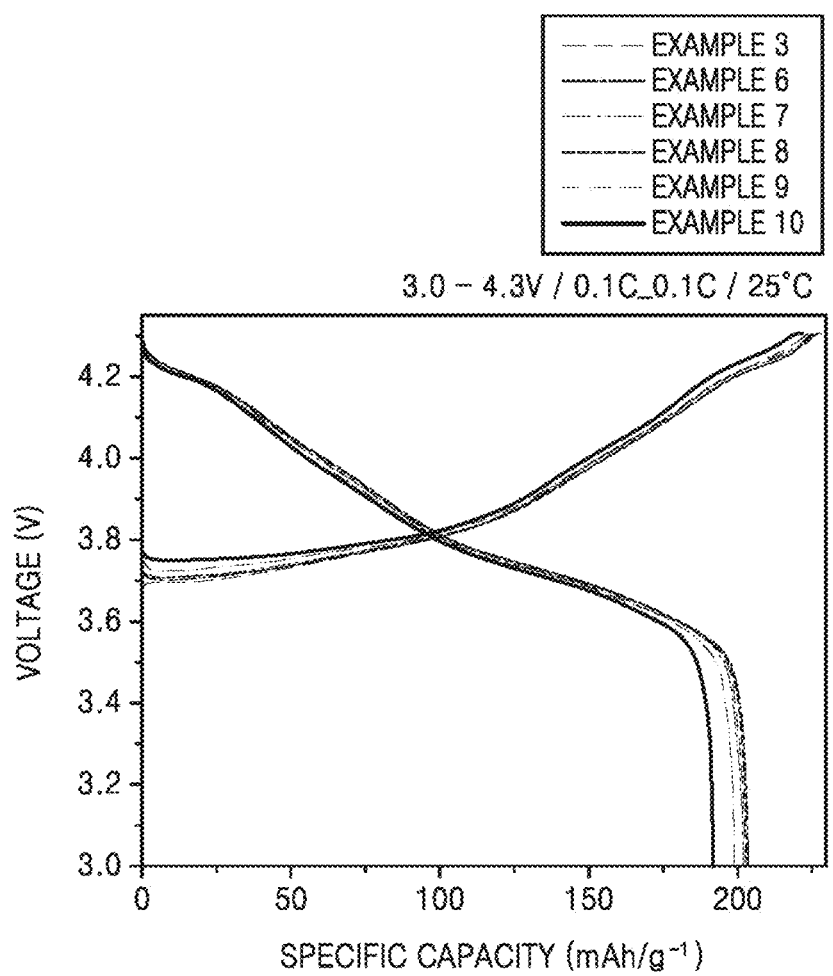
FIG. 11 is a graph illustrating charge and discharge curves of half cells according to Example 3 and Examples 6 to 10.

Referring to Table 5 and FIG. 11, in the half cells of Examples 6 to 10, which include the monocrystalline cathode active materials obtained by partially substituting a trace amount of P into vacant sites in a regular tetrahedron in the monocrystalline cathode active material of Preparation Example 3 for a lithium secondary battery, no significant difference in initial formation capacity and initial efficiency appeared when the P content was 0.0016 mol % or less, while an initial capacity reduction of about 1% to about 5% and an initial efficiency reduction of about 1% to about 3% occurred when the P content was 0.0030 mol % or greater.

Figure 12:
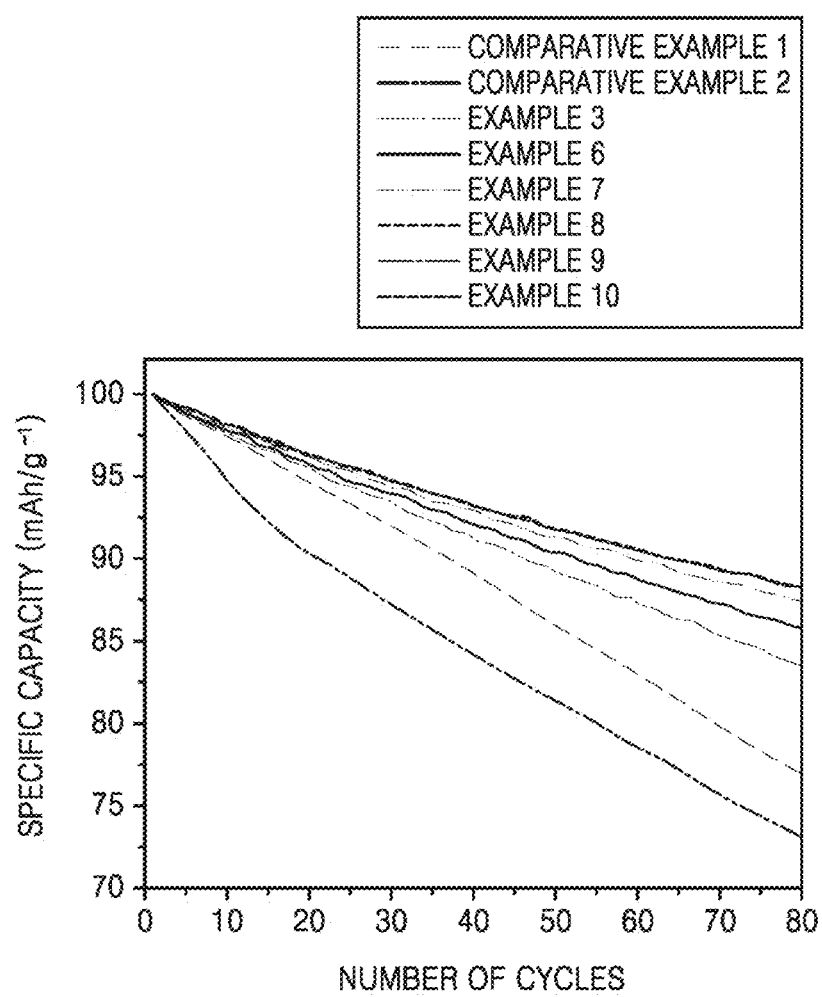
FIG. 12 is a graph of specific capacity with respect to the number of charge and discharge cycles in half cells of Example 3, Examples 6 to 10, and Comparative Examples 1 and 2.

Referring to Table 6 and FIG. 12, the secondary battery of Example 3, including the monocrystalline Ni-based cathode active material for a secondary battery, exhibited a cycle extension after 80 cycles at room temperature that was higher by about 7% to about 11%), even when evaluated at a high electrode density, compared to the rechargeable batteries of Comparative Examples 1 and 2 using the Ni-based cathode active materials as secondary particles. In addition, when a trace amount of P was substituted into vacant sites in the regular tetrahedron of the monocrystalline cathode active material for a lithium secondary battery (Examples 6 to 10), the larger the content (mole % by weight) of the substituted P atom, the greater the improvement in lifetime.

(5) Evaluation of Electrode Plate Cross-Section Before and after Electrochemical Evaluation of Monocrystalline Cathode Active Material Before and after the electrochemical evaluation of the half cell of Example 3, cross-sections of the electrode plate were observed by scanning electron microscopy (SEM). The results are shown in FIGS. 13 and 14.

Figure 13:
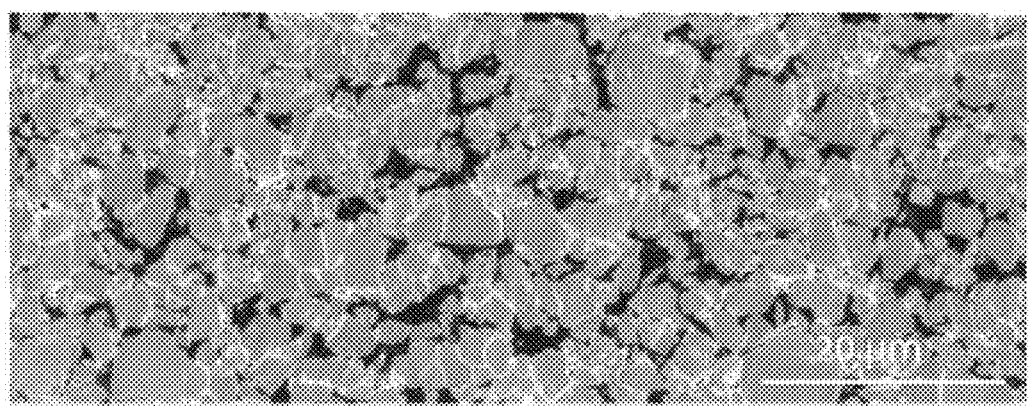
FIG. 13 shows cross-sectional SEM images of an cathode used in Example 3, having an electrode density of about 3.6 g/cc, before an electrochemical evaluation.
Figure 13:
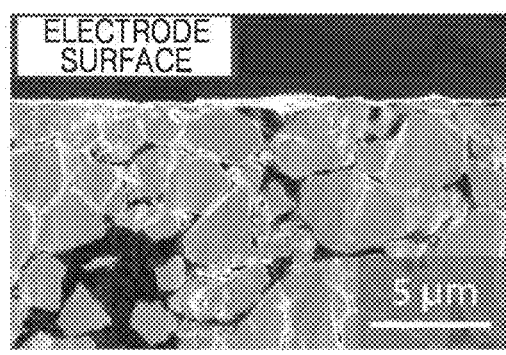
Figure 13:
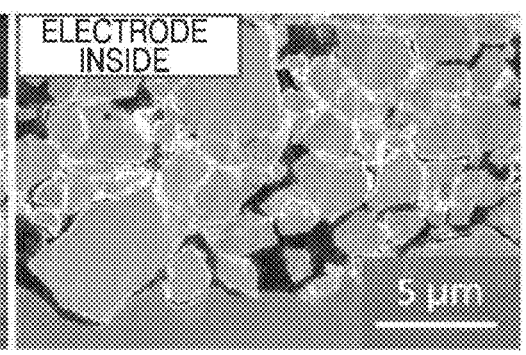

Referring to FIG. 13, in the cathode used in Example 3, the particle shape of the cathode active material was maintained at a high electrode density (~3.6 g/cc), without particle disintegration. This may prevent, when electrochemical evaluation is performed, exposure of new cathode/electrolyte interfaces due to particle disintegration, and inhibit a side reaction with the electrolyte, consequently suppressing gas generation and improving lifetime characteristics. This means that a monocrystalline cathode active material, not a cathode active material in the form of secondary particles, is essential in order to develop a high-energy lithium secondary battery working at a high electrode density (~3.6 g/cc).

Figure 14:
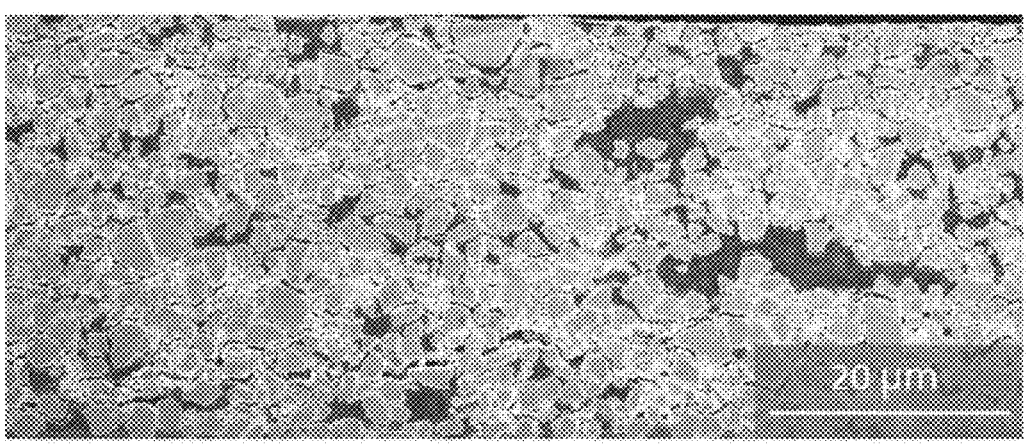
FIG. 14 shows cross-sectional SEM images of the cathode used in Example 3, having an electrode density of about 3.6 g/cc, after 80 cycles at room temperature.
Figure 14:
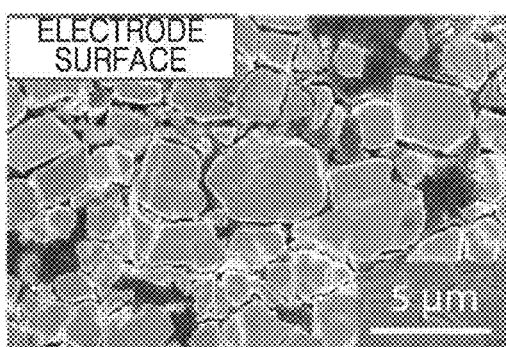
Figure 14:
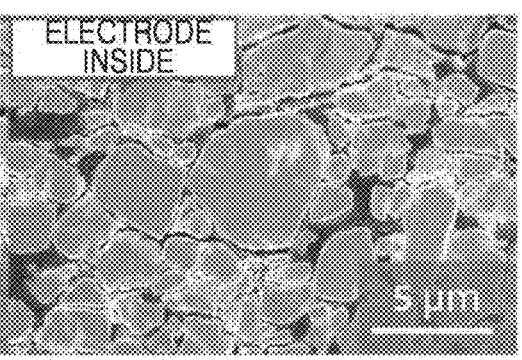
Figure 15:
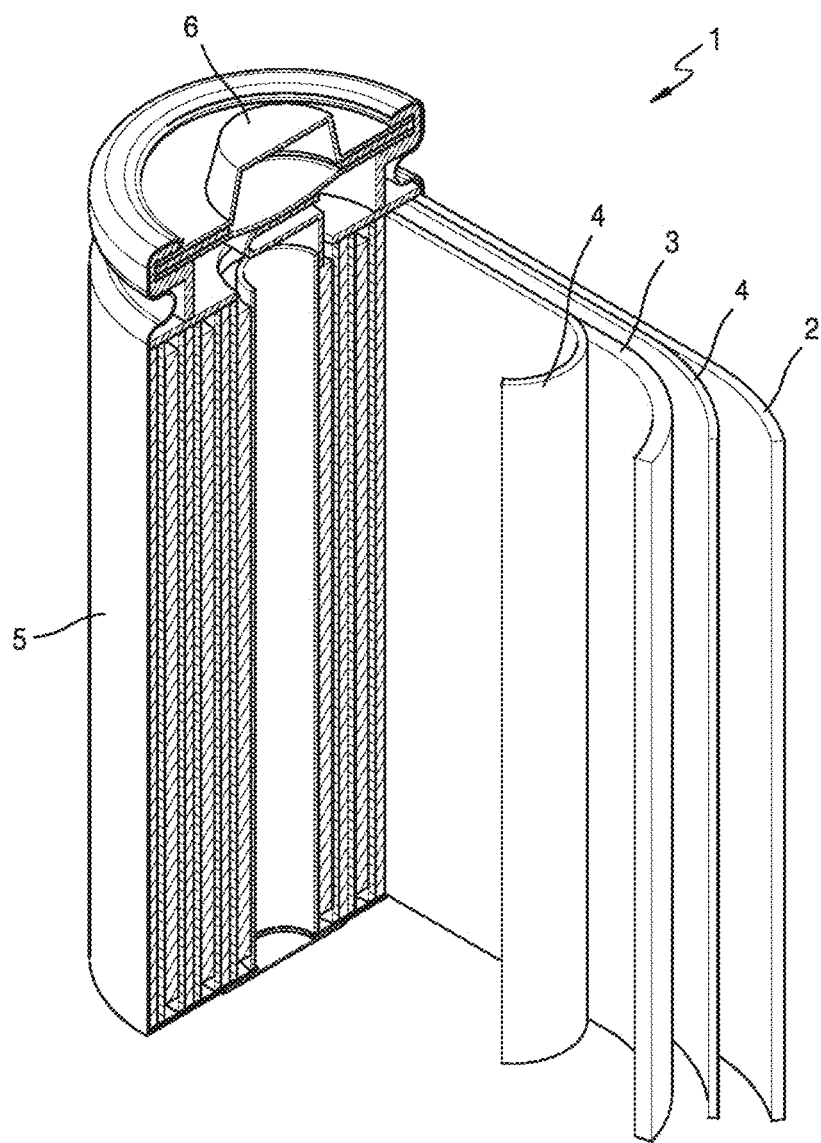
FIG. 15 is a schematic view of a lithium battery according to an example embodiment.

Referring to FIG. 14, as a result of evaluating the cross-section of the cathode used in Example 3 after the evaluation of lifetime at room temperature, the particle shape of the cathode active material was maintained, as before the cycles, at a high electrode density (~3.6 g/cc). Accordingly, a lifetime deterioration problem with a cathode active material in the form of secondary particles, in which micro-cracking inside the particles generates newly exposed electrode/electrolyte interfaces such as to accelerate side reactions with a liquid electrolyte and structural changes, is recognized as a major deterioration mechanism, and may be resolved by introducing the monocrystalline cathode active material for a lithium secondary battery.

In putting together the above-described results of the evaluation examples, using the monocrystalline Ni-based cathode active material for a lithium secondary battery, according to one or more embodiments, a capacity equivalent to that provided by a secondary-particle-type Ni-based cathode active material synthesized using a conventional co-precipitation method may be implemented, and at the same time lifetime characteristics at room temperature may also be improved at a high electrode density energy density (~3.6 g/cc) without particle disintegration. These results mean significant improvement in capacity per volume and energy density over secondary-particle type Ni-based cathode active materials for use in a lithium secondary battery. Furthermore, the monocrystalline Ni-based cathode active material for a lithium secondary battery, according to one or more embodiments, may reduce residual lithium and improve lifetime characteristics at room temperature by substitution of a trace amount of P into vacant sites of a regular tetrahedron in the structure of the cathode active material.

While one or more embodiments have been described with reference to the appended drawings, it will be understood by those of ordinary skill in the art that various changes in form and details may be made therein without departing from the spirit and scope as defined by the following claims. Therefore, the scope of the disclosure is defined not by the detailed description of the disclosure but by the appended claims.

The invention claimed is:

1. A cathode active material for a lithium secondary battery, the cathode active material being monocrystalline and represented by Formula 1:

$$Li_xP_yNi_{1-a-b}Co_aA_bO_2 \qquad \text{<Formula 1>}$$

wherein, in Formula 1, $0.98 \leq x \leq 1.02$, $0.0002 < y \leq 0.007$, $0 < a \leq 0.2$, $0 \leq b \leq 0.3$, and A is at least one element selected from Mn, Al, Mg, and V wherein, the P atom is located at a tetrahedral site of a monocrystalline layered structure.

2. The cathode active material of claim 1, wherein the monocrystalline cathode active material is provided as single particles.

3. The cathode active material of claim 1, wherein the monocrystalline cathode active material has an average particle diameter greater than about 1.5 μm and smaller than or equal to about 18 μm.

4. The cathode active material of claim 1, wherein A in Formula 1 comprises Mn, Al, or a combination thereof.

5. The cathode active material of claim 1, wherein, in Formula 1, A comprises Mn, and $0 < b \leq 0.3$.

6. The cathode active material of claim 1, wherein, in Formula 1, A comprises Al, and $0 < b \leq 0.05$.

7. The cathode active material of claim 1, wherein, the P atom is located inside a monocrystalline layered structure.

8. A method of preparing the cathode active material of claim 1 for a lithium secondary battery, the method comprising:

preparing a premixture of a lithium source and a transition metal source;

mixing the premixture under an oxidizing atmosphere to thereby obtain a lithium transition metal-containing mixture; and thermally treating the lithium transition metal-containing mixture to thereby obtain a monocrystalline lithium transition metal composite oxide, wherein the premixture further comprises a phosphorus source.

9. The method of claim 8, wherein the mixing is performed using a mechanical mixing method.

10. The method of claim 8, wherein the thermal treatment comprises a first thermal treatment step and a second thermal treatment step.

11. The method of claim 10, wherein a thermal treatment temperature in the first thermal treatment step is higher than a thermal treatment temperature in the second thermal treatment step.

12. The method of claim 10, wherein a thermal treatment time in the first thermal treatment step is shorter than a thermal treatment time in the second thermal treatment step.

13. The method of claim 8, wherein the monocrystalline lithium transition metal composite oxide is provided as single particles and has a layered structure.

14. The method of claim 8, wherein the monocrystalline lithium transition metal composite oxide has an average particle diameter of greater than 1.5 μm and less than 20 μm.

15. A cathode comprising the monocrystalline cathode active material according to claim 1.

16. A lithium secondary battery comprising:
the cathode according to claim 15;
an anode; and
an electrolyte.

* * * * *